United States Patent Office 3,281,896
Patented Nov. 1, 1966

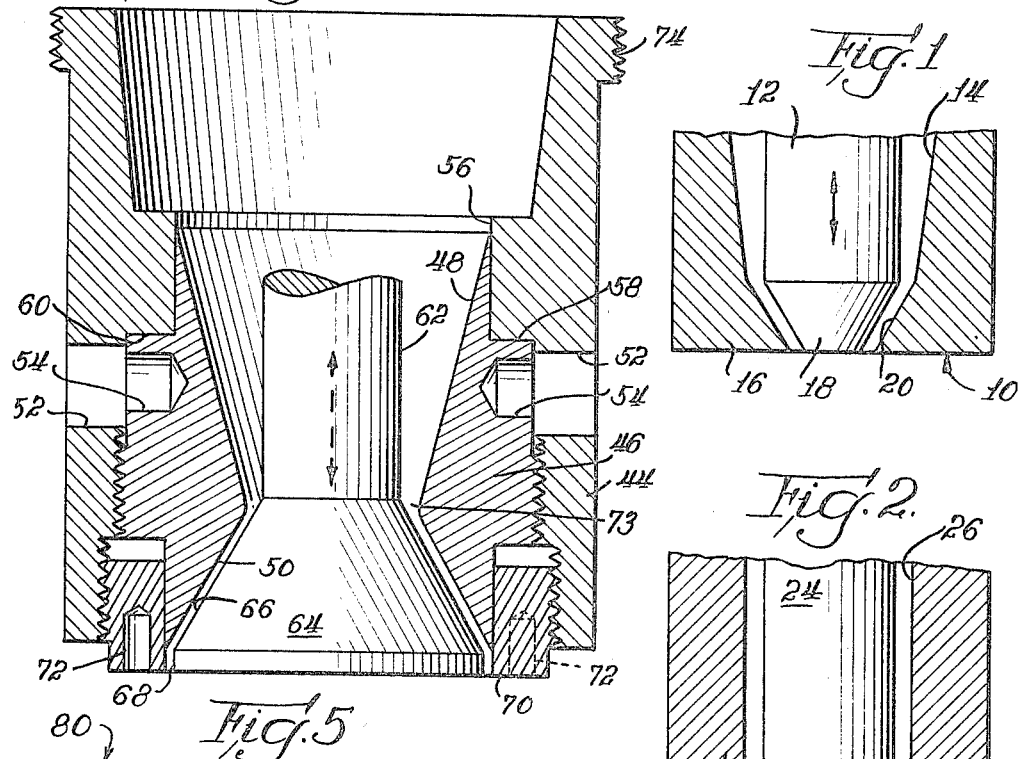
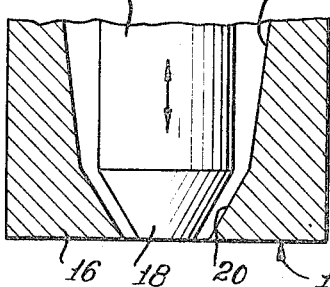
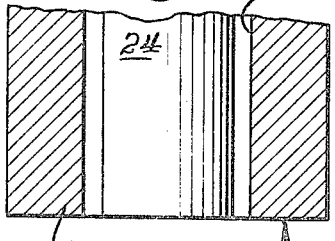
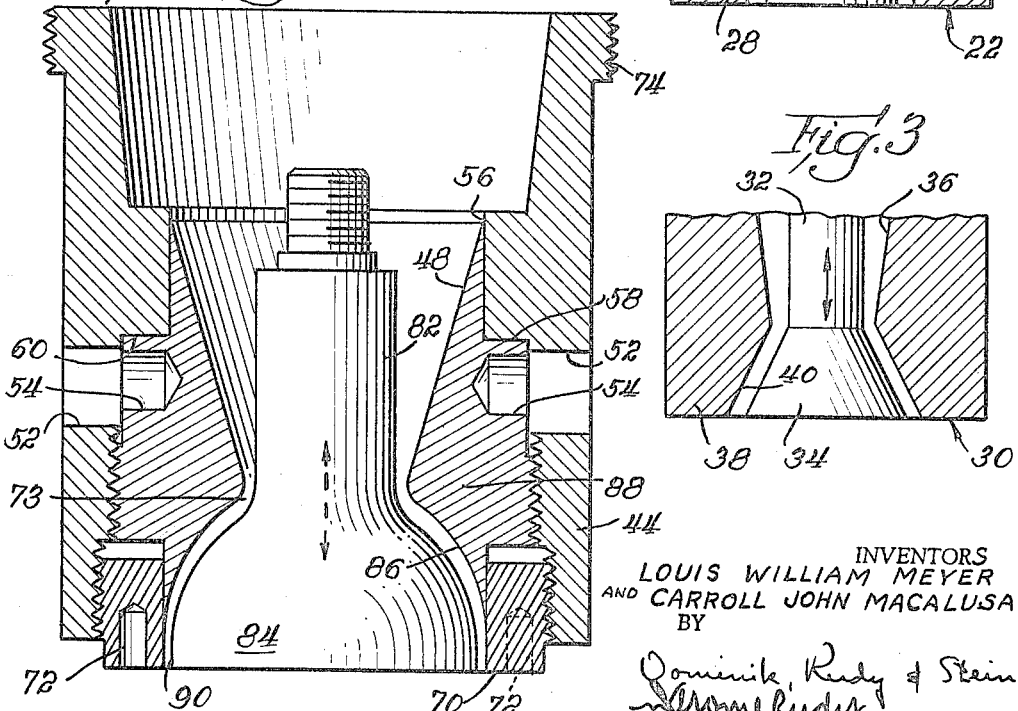

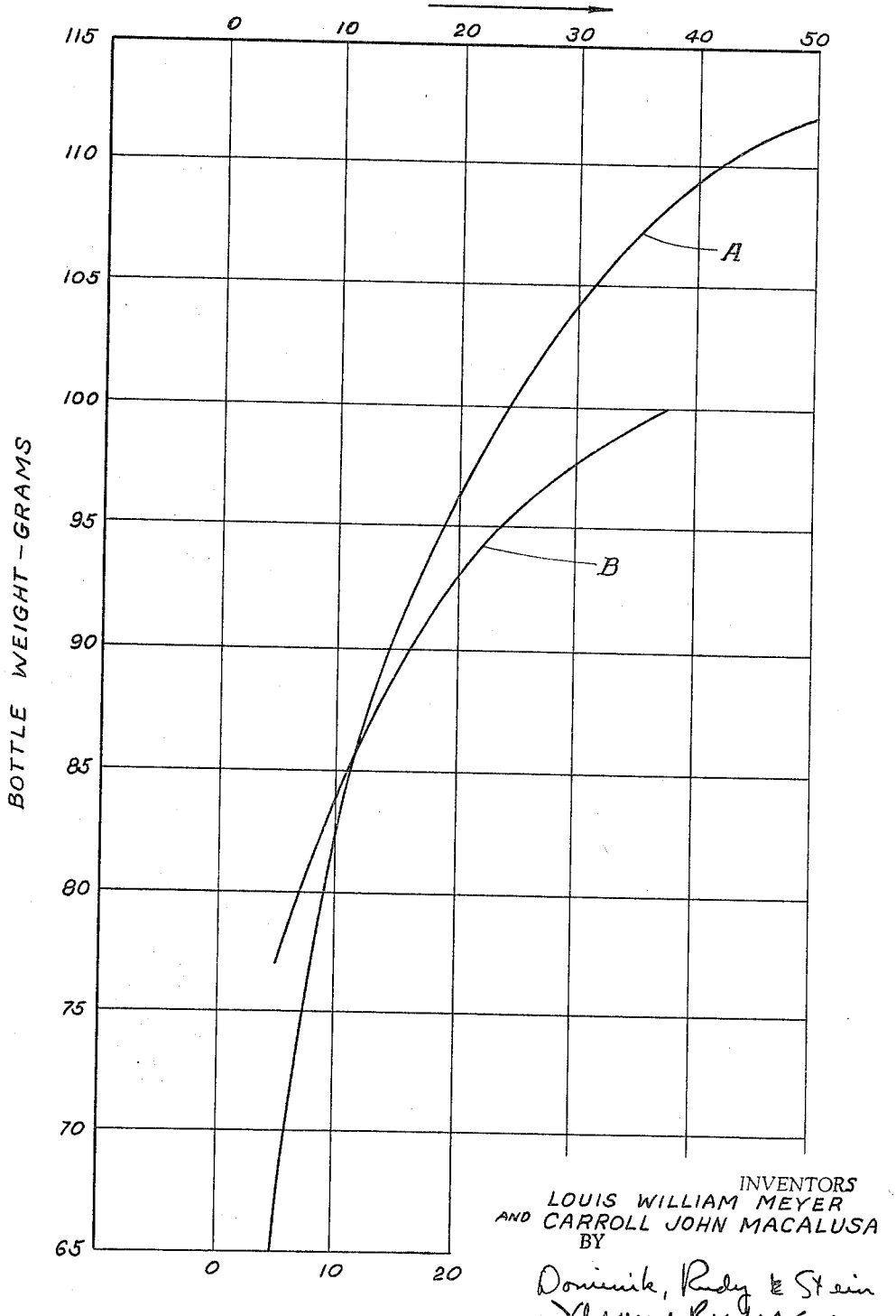

3,281,896
PARISON EXTRUSION DIE
Louis William Meyer, Plaquemine, and Carroll John Macalusa, Baton Rouge, La., assignors to The Dow Chemical Company, Midland, Mich., a corporation of Delaware
Filed Sept. 12, 1963, Ser. No. 308,445
2 Claims. (Cl. 18—14)

This invention relates to apparatus for dimension control of an extruded polymer.

When a polymer is extruded from a die orifice, there is a tendency for the polymer to "swell," that is, the dimension of the extrudate in a direction normal to direction of movement of the extrudate, will be somewhat greater than the comparable dimension of the die orifice. The degree of swell is a function of the given polymer, as well as the particular die geometry involved. For example, if the die orifice is a round hole, the swell will simply be an increase in diameter, and the degree of swell would be the ratio of the extrudate diameter to the diameter of the orifice.

In the case of an annular orifice, such as wherein a mandrel is axially positioned in an opening to form a parison extrudate, swell will occur in two dimensions. First, there will be an increase in thickness of the parison wall, and second, there will be an increase in overall diameter of the parison. Thickness swell and diameter swell for a cylindrical shape, may be equal but more often they are not. The multiplication of these two swell dimensions yields a figure known as "total volume swell," which is a direct function of parison weight.

Briefly, the inventive concept involves a mandrel end portion having a diameter which progressively increases in the direction of the extrusion orifice. Such a construction has the effect of causing multi-lateral flow of the polymer as it moves toward the extrusion orifice, which results in a release, or mitigation of compressive stresses in the polymer. Such stress release has a tendency to eliminate swell whereby better dimensional tolerances may be maintained in the extruded parison. An axially movable throat piece is arranged in the extrusion die which may be adjusted to control weight of the parison.

Supplementing such structure, is the provision of a sleeve which defines the outer surface of the extrusion orifice at the point of polymer egress from the orifice. The sleeve is made axially movable so that the lower surface of the sleeve may be adjusted relative to the lower surface of the die mandrel. The importance of the relative position of these die surfaces is highly significant since the polymer always tends to slide or flow toward the last part of the die with which it is in contact as it is extruded. In other words, if the die mandrel is below the lower sleeve face, the parison has a tendency to scallop, or be pulled inwardly; while if the sleeve face is below the mandrel, the parison has a tendency to curl, or swell outwardly. Accordingly, the adjustable sleeve may be utilized to effect minor adjustments of parison diameter swell, either inwardly, or outwardly.

The apparatus of the invention may be used to provide for constant diameter swell as well as constant weight, when changing polymers in an extrusion die. It may be used to provide for less than 10 percent diameter swell when using a variety of materials.

A primary object of this invention is to provide apparatus for dimension control of an extruded polymer.

A more specific object is to provide control of an extruded parison to form blown bottles within a given weight range.

A related object is to provide control of volume swell in an extruded polymer parison.

Still another object is to provide for control of scalloping or curling in an extruded polymer parison.

A further object is to provide a constant weight extrudate with different types of polymers.

These and further objects and features of the invention will become more apparent from the following description and accompanying drawings wherein:

FIGS. 1–3 are fragmentary section views of three basic types of known parison extrusion dies;

FIG. 4 is a section view of a parison extrusion die illustrative of a first embodiment of the invention;

FIG. 5 is a section view of a parison extrusion die illustrative of a second embodiment of the invention; and FIG. 6 is a graph of curves showing certain performance characteristics of the dies of the FIGS. 4 and 5 embodiments.

Referring now to the drawings, FIG. 1 illustrates a parison extrusion die assembly 10 which includes a longitudinally movable mandrel, or pin 12, which is concentrically arranged in a cylindrical passageway 14 formed in an extruding die, or head 16. The lower end of the core has a frusto-conical shape 18 the tapered side of which is parallel to a tapered surface 20 formed at the lower end of the passageway 14. Means (not shown) are provided for movably adjusting the longitudinal position of the mandrel 12 so that the thickness of the tubular extrudate may be regulated. In such an extrusion die assembly, while there is weight control of extrudate, there is little, if any, diameter swell control since the exit opening is of reduced cross-section area as compared with the cross-section area of the annular passageway upstream in the die assembly. In effect, the material is compressed just prior to exit from the die exit, which compressive forces are relieved by expansion, or swell of the material after being extruded.

An extrusion die assembly 22 illustrated in FIG. 2, includes a cylindrical mandrel, or pin 24, which is concentrically arranged in a generally cylindrical passageway 26 formed in an extruding die, or head 28. The die assembly 22 does not provide for control of either weight or diameter swell, hence, has rather limited application, or use, except under conditions wherein such factors are not critical or of special concern.

An extrusion die assembly 30 illustrated in FIG. 3, includes a cylindrical mandrel, or pin 32 having a reverse conical head portion 34. The mandrel 32 is concentrically arranged in a generally cylindrical passageway 36 formed in an extruding head, or die 38, which has a tapered surface 40 substantially parallel with the surface of the head portion 34. Means (not shown) are provided for movably adjusting the longitudinal position of the mandrel 32 so that the thickness of the tubular extrudate may be regulated. While the die assembly 30 will provide extrudate weight control, and some degree of swell control, it will not normally control against scalloping or curling, as defined hereinbefore.

The die assemblies 10, 22 and 30 represent three basic types of known parison extrusion dies, all of which have certain inherent disadvantages as mentioned, and which are overcome in the die assembly of the present invention, which will now be described.

The first embodiment illustrated in FIG. 4 comprises a die assembly 42 including an extruder head piece 44 which is of cylindrical shape and which is arranged to enclose a circular throat piece 46 having two frustoconical, axially aligned interior surfaces 48 and 50. The throat piece 46 is threadably supported within the head piece 44 and may be adjusted longitudinally by means of a tool (not shown) which may be inserted through opening 52 formed in the head piece for engagement with one of a plurality of recesses 54 (two shown) arcuately disposed about the periphery of the throat piece 46. It will be seen that the major diameter of the conical surface 48 is substantially equal to an inner diameter 56 formed in the head piece 44, and that in maximum open position of the die assembly, a shoulder 58 formed on the throat piece 46 will abut a shoulder 60 formed in the head piece.

Concentrically disposed within the head piece 44 and fixed against axial movement, is a mandrel, or pin 62 having a reverse frusto-conical head portion 64 at the lower end. A tapered side surface 66 of the mandrel is arranged substantially parallel with the surface 50 of the throat piece 46. At the extreme lower end of the head portion 64, a straight land flat surface 68 is provided which lays in a circular plane concentric with the axis of the mandrel 62. Threadably supported at the lower end of the head piece 44 and in sliding engagement with the throat piece 46, is a circular sleeve 70 the inner diameter of which is substantially equal to the maximum diameter of the conical surface 50 of the throat piece. Rotation of the sleeve 70 by means of a spanner wrench (not shown) which can engage openings 72 formed in the sleeve, will adjust the longitudinal setting of the sleeve for purposes of which will hereinafter be described.

The area of the annular space between the surface 68 and the sleeve 70, should be approximately twice the area of the annular space in the region of the minimum diameter of the side surface 66 and the adjacent throat surface, which will hereinafter be referred to as the "compression zone" and identified by numeral 73.

The die assembly 42 may be removably secured to an extruder (not shown) by means of a threaded portion 74 arranged at the upper exterior surface of the head piece 44.

Operation of the die assembly 42 is as follows: Assume that a polymer material in extrudable form is moved from the extruder downwardly toward the mandrel head portion 64. It will be seen that as the material approaches the head portion 64, it will be compressed in the compression zone 73 by virtue of the reduced cross-section area of the flow passageway in said zone. Such a reduction in area will result in increase of flow rate of the polymer. On leaving the compression zone, the flow direction of the polymer becomes multi-lateral since the volume defined between the surfaces 50 and 66 is progressively increasing. This is evidenced by reduced linear flow of the polymer in the axial direction and increased linear flow in the circumferential direction. By providing for such multi-lateral flow, polymer swell at the extruding exit of the die will be kept to a minimum since the "memory" effects of the polymer caused by flow orientation, are substantially dissipated before the polymer is finally extruded.

Adjustment of the sleeve 70 will correct either parison curl or sag since the polymer tends to stick or flow towards the last piece of metal contacted as the polymer leaves the die assembly. In other words, if the lower extremity of the sleeve 70 were below that of the core surface 68, the polymer would curl, or swell radially outward, while if the relative position of the sleeve and core surface were reversed, the polymer would scallop or swell radially inward. Accordingly, longitudinal adjustment of the sleeve 70 may thus be utilized for minor adjustments of parison swell either in or out.

The second embodiment of the subject invention shown in FIG. 5, is generally similar to the die assembly 42, and all parts in common therebetween will be identified with like numerals. A die assembly 80 illustrative of the second embodiment, differs primarily from the die assembly 42 by having a mandrel 82 with a semi-hemispherical or bell shaped head 84 at the lower end thereof, which head is in spaced relation to a curved surface 86 formed in a throat piece 88. The lower extremity of the head 84 is provided with a straight land section 90, the surface of which is parallel with the inner surface of the sleeve 70. Like the mandrel 62 of die assembly 42, the mandrel 82 is fixed against longitudinal movement, and parison thickness control is effected by the position of the throat piece 88 relative to the mandrel.

In both embodiments, it will be seen that the mandrel may be arranged for longitudinal movement to function as a shut-off valve, if so desired. Further parison dimension, or polymer distribution control may be effected by movement of either the mandrel or the throat piece during parison extrusion. Likewise, adjustment of the sleeve may be utilized to accentuate scalloping, or curling of the parison, if desired.

FIG. 6 shows performance curves of the extruding dies of the FIG. 4 and FIG. 5 embodiment, curve "A" being the result using the die assembly 42, while curve "B" is that using the die assembly 80. Both die assemblies had a 2½-inch outer diameter orifice, a 0.050-inch annular opening at the straight land section, and a straight land length of approximately 3/16 inch. The polymer extruded by each die assembly was a high density polyethylene produced by the Dow Chemical Company, and commercially identified as R–301. The abscissa represents throat adjustment position, while the ordinate represents bottle weight (grams) formed from the parison extrudate of each die assembly. Minimum throat opening was obtained by moving the throat piece until it touched the mandrel head portion and then backed off until the opening was sufficient so as to make a good parison; each throat piece was moved to increase throat opening in 0.020-inch increments until maximum throat opening was reached.

It will be noted that the die assembly 42 produced a greater weight range of blown bottles as compared with the die assembly 80. This may be attributable to the fact that movement of the throat piece 88 of the die assembly 80, does not reduce passageway thickness as radically as that of throat piece 46 in die assembly 42.

In the case of either embodiment disclosed, movement of the throat pieces 46 or 88 for extrudate weight adjustment, may be made without introducing a problem of either parison curl or scallop, because the sleeve 70 may be set to correct such induced factors, as hereinbefore pointed out.

The mandrel, in addition to being movable to act as a shut-off valve if desired, may be moved during extrusion to change the material distribution in the parison. Likewise, movement of the throat piece during extrusion may be utilized to produce a similar result.

It will be apparent from the foregoing that both embodiments 42 or 80 will satisfy all the objectives of the invention.

The foregoing description has been given in detail without thought of limitation since the inventive principles involved are capable of assuming other forms without departing from the spirit of the invention or the scope of the following claims.

What is claimed is:

1. A parison extrusion die comprising, in combination: an extruder head piece; a mandrel positioned in said head piece, said mandrel having an end surface and an end portion which increases in diameter in the direction of said end surface; a throat piece supported in said head piece and terminated short of said mandrel end surface, said throat piece having a surface which conforms in shape with said mandrel end portion and is disposed adjacent thereto; means to adjust the relative longitudinal position between said throat piece and said mandrel; and a sleeve in sliding engagement with said throat piece and extendable therefrom for adjustment relative to the end surface of said mandrel, said mandrel and said sleeve forming an extrusion orifice which is adjustable, whereby curling and scalloping of the parison is substantially eliminated.

2. A parison extrusion die comprising, in combination: an extruder head piece; a mandrel fixedly positioned in said head piece, said mandrel having an end surface and an end portion which increases in diameter in the direction of said end surface and which terminates in a straight land flat surface which lays in a circular plane concentric with the axis of said mandrel; a throat piece movably supported in said head piece and terminated short of said mandrel end surface and having a surface which conforms in shape with said mandrel end portion and is disposed adjacent thereto; and means to adjust the relative longitudinal position of said throat piece with respect to said mandrel; and a sleeve in sliding engagement with said throat piece, said sleeve and said mandrel forming an extrusion orifice, said sleeve being longitudinally adjustable relative to the end surface of said mandrel, whereby an end thereof may be selectively positioned relative to said mandrel end surface to thereby substantially eliminate curling and scalloping of said parison.

References Cited by the Examiner

UNITED STATES PATENTS

| | | | |
|---|---|---|---|
| 2,175,053 | 10/1939 | Ferngren | 18—5 X |
| 2,349,178 | 5/1944 | Kopitke | 18—5 X |
| 3,091,803 | 6/1963 | Scott | 18—5 |
| 3,097,058 | 7/1963 | Branscum et al. | 18—55 |
| 3,102,303 | 9/1963 | Lainson | 18—14 |
| 3,103,409 | 9/1963 | Bohres et al. | |
| 3,105,269 | 10/1963 | Seubert | 18—14 |
| 3,209,404 | 10/1965 | Hagen | 18—14 |

J. SPENCER OVERHOLSER, *Primary Examiner.*

ALEXANDER H. BRODMERKEL, ROBERT F. WHITE, WILLIAM J. STEPHENSON, *Examiners.*

M. ROSEN, W. L. McBAY, *Assistant Examiners.*